US008776615B2

(12) United States Patent
Kempainen et al.

(10) Patent No.: US 8,776,615 B2
(45) Date of Patent: Jul. 15, 2014

(54) THREE-AXIS LOW PROFILE LOAD CELL AND SENSING BEAM (75) Inventors: Alan J. Kempainen, Ostrander, OH (US); Justin Sauber, Columbus, OH (US)

(73) Assignee: Honeywell International Inc., Morristown, NJ (US)

( * ) Notice: Subject to any disclaimer, the term of this patent is extended or adjusted under 35 U.S.C. 154(b) by 158 days.

(21) Appl. No.: 13/461,298

(22) Filed: May 1, 2012

(65) Prior Publication Data
US 2013/0291653 A1 Nov. 7, 2013

(51) Int. Cl.
*G01L 1/22* (2006.01)
(52) U.S. Cl.
USPC ............. 73/862.044; 73/862.043; 73/862.045
(58) Field of Classification Search
USPC .................. 73/862.043, 862.044, 862.045
See application file for complete search history.

(56) References Cited

U.S. PATENT DOCUMENTS

| 4,448,083 A * | 5/1984 | Hayashi ................... 73/862.042 |
| 2006/0037409 A1 * | 2/2006 | Ichige ............................. 73/862 |

FOREIGN PATENT DOCUMENTS

| JP | 10332502 A * | 12/1998 | ............... G01L 5/16 |
| WO | WO 9904235 A1 * | 1/1999 | ............... G01L 5/16 |

OTHER PUBLICATIONS

Author: unknown, Title: Practical Strain Gage Measurements, Date: 1999, Publisher: Agilent Technologies, vol. Application Note 290-1, pp. E-97 to E-130.*
Machine Translation of Japanese Patent Application Publication JP10-332502 to Kyo et al., Date: Dec. 18, 1998, Publisher: Patent Abstracts of Japan. pp. 1 of 8.*

* cited by examiner

*Primary Examiner* — Lisa Caputo
*Assistant Examiner* — Roger Hernandez-Prewit
(74) *Attorney, Agent, or Firm* — Craige Thompson; Thompson Patent Law Offices (57) ABSTRACT

This disclosure describes techniques for using a "low-profile" load cell to sense a force exerted by a load upon a target object in one or more of a first, second, and third directions relative to the target object. The techniques include using a plurality of sensing beams disposed between a sensing node and a base of the load cell, where each sensing beam is configured for sensing the force exerted by the load upon the sensing node in one or more of two directions relative to the load cell. For example, each sensing beam may include a first section configured to deform in response to a component of the force that corresponds to one of the first, second, and third directions, and a second section configured to deform in response to a component of the force that corresponds to another one of the first, second, and third directions.

20 Claims, 5 Drawing Sheets

FIG. 5

THREE-AXIS LOW PROFILE LOAD CELL AND SENSING BEAM

TECHNICAL FIELD

This disclosure relates to techniques for sensing force, and more particularly, to techniques for using a load cell to sense a force exerted by a load upon a target object in one or more of a first, second, and third directions relative to the target object.

BACKGROUND

Load cells are among a number of electro-mechanical transducers that may be used to sense a force exerted by a load, such as, for example, a beam, upon a target object. A load cell may be used to sense the force by first coupling a movable sensing portion of the load cell, which may be referred to as "a sensing node," to the target object, and coupling a base portion of the load cell, which may be referred to as "a base," to a fixed, non-movable reference point, e.g., a system chassis. After the force is applied to the target object, and thus to the sensing node, flexible components of the load cell, which may be referred to as "sensing beams," that couple the sensing node to the base and make the sensing node movable with respect to the base, may deform in response to the applied force. For example, the sensing beams may deform by an amount that is proportional to the applied force.

Subsequently, deformation sensors, e.g., strain gages (sometimes referred to as strain "gauges"), disposed on the sensing beams, in conjunction with associated electrical bias and conditioning circuitry, may transform the deformations of the sensing beams into electrical signals indicative of the deformations, and output the signals as a representation of a magnitude of the force applied to the target object. For example, the strain gages may be arranged in a commonly used Wheatstone-Bridge configuration. Additionally, in some examples, the sensing beams may be oriented within the load cell in such a manner that allows a particular subset of the sensing beams to deform in response to a particular component of the applied force, and to not substantially deform in response to all other components of the force. For example, multiple subsets of the sensing beams may be configured within the load cell in this manner, such that each of the subsets of the sensing beams deforms in response to a different component of the applied force. In this manner, the load cell may be used to sense not only an overall magnitude of the force applied to the target object, but also a magnitude of each of one or more components of the force that correspond to particular directions with respect to the target object, and, therefore, the load cell. Sensing force in the manner described above may be useful in a variety of applications, including, for example, measurement and calibration, process control, and manufacturing applications, as some examples.

Existing load cells are generally configured to sense force in one or two directions, namely, in one or more of an X-direction and a Y-direction, relative to a particular load cell. Such load cells may be referred to as "low-profile" load cells, since the sensing beams used to sense the force in the one or two directions may be arranged in a low-profile plane (e.g., the X-Y plane) within each load cell. In order to sense force in additional directions, e.g., in the Z-direction, multiple load cells may be combined within a given force sensing application. Alternatively, a more complex "high-profile" load cell may be used that employs additional sensing beams disposed outside of (e.g., perpendicular with respect to) the low-profile plane and configured to deform in response to a component of the force that corresponds to each of the additional directions. Accordingly, existing techniques for using load cells to sense force in more than two directions relative to a target object may require using multiple "low-profile" load cells each configured to sense force in up to two directions, or a single more complex "high-profile" load cell configured to individually sense force in more than two directions.

SUMMARY

In general, this disclosure describes techniques for using a load cell to sense a force exerted by a load upon a target object in one or more of a first, second, and third directions relative to the target object. For example, a "low-profile" load cell for sensing a force exerted by a load upon a sensing node of the load cell in one or more of a first, second, and third directions relative to the load cell is disclosed. Additionally, a sensing beam disposed between a base of a load cell and a sensing node of the load cell, the sensing beam configured for sensing a force exerted by a load upon the sensing node in one or more of a first and a second direction relative to the load cell, is disclosed. As one example, a plurality of such sensing beams may be disposed within the load cell to enable sensing a force exerted by a load upon the sensing node in one or more of a first, second, and third directions relative to the load cell. For example, the respective first and second directions relative to the load cell in which the force is sensed by each such sensing beam may correspond to any two of the first, second, and third directions relative to the load cell in which the force is sensed by the overall load cell. Finally, a method of sensing a force exerted by a load upon a sensing node of a load cell in one or more of a first, second, and third directions relative to the load cell, is described.

In one example, a load cell for sensing a force exerted by a load upon a sensing node of the load cell in one or more of a first, second, and third directions relative to the load cell is disclosed. The load cell includes a plurality of sensing beams disposed between the sensing node and a base of the load cell. The load cell further includes a first one or more strain gages disposed upon a first one or more of the plurality of sensing beams, wherein each of the first one or more strain gages is positioned perpendicularly with respect to the first direction, and wherein the first one or more of the plurality of sensing beams and the first one or more strain gages disposed thereon deform in response to a component of the force that corresponds to the first direction. The load cell still further includes a second one or more strain gages disposed upon a second one or more of the plurality of sensing beams, wherein each of the second one or more strain gages is positioned perpendicularly with respect to the second direction, and perpendicularly with respect to each of the first one or more strain gages, and wherein the second one or more of the plurality of sensing beams and the second one or more strain gages disposed thereon deform in response to a component of the force that corresponds to the second direction. The load cell still further includes a third one or more strain gages disposed upon at least one of the first and second one or more of the plurality of sensing beams, wherein each of the third one or more strain gages is positioned perpendicularly with respect to the third direction, and perpendicularly with respect to each of the first and second one or more strain gages, and wherein the at least one of the first and second one or more of the plurality of sensing beams and the third one or more strain gages disposed thereon deform in response to a component of the force that corresponds to the third direction.

In another example, a sensing beam disposed between a base of a load cell and a sensing node of the load cell is disclosed. The sensing beam is configured for sensing a force exerted by a load upon the sensing node in one or more of a first and a second direction relative to the load cell. The sensing beam includes a first section configured to deform in response to a component of the force that corresponds to the first direction, and a second section configured to deform in response to a component of the force that corresponds to the second direction.

In still another example, a method of sensing a force exerted by a load upon a sensing node of a load cell in one or more of a first, second, and third directions relative to the load cell is disclosed. The method includes determining an amount of deformation of each strain gage of a first one or more strain gages disposed upon a first one of a plurality of sensing beams disposed between the sensing node and a base of the load cell while the force is exerted by the load upon the sensing node of the load cell. In this example method, the amount of deformation of the respective strain gage is indicative of a magnitude of a component of the force that corresponds to the first direction. The method further includes determining an amount of deformation of each strain gage of a second one or more strain gages disposed upon a second one or more of the plurality of sensing beams while the force is exerted by the load upon the sensing node of the load cell, wherein the amount of deformation of the respective strain gage is indicative of a magnitude of a component of the force that corresponds to the second direction. The method still further includes determining an amount of deformation of each strain gage of a third one or more strain gages disposed upon at least one of the first and second one or more of the plurality of sensing beams while the force is exerted by the load upon the sensing node of the load cell, wherein the amount of deformation of the respective strain gage is indicative of a magnitude of a component of the force that corresponds to the third direction.

The details of one or more examples are set forth in the accompanying drawings and the description below. Other features, objects, and advantages in addition to those described below will be apparent from the description and drawings, and from the claims.

DETAILED DESCRIPTION

This disclosure describes techniques for using a load cell to sense a force exerted by a load upon a target object in one or more of a first, second, and third directions relative to the target object. For example, a "low-profile" load cell for sensing a force exerted by a load upon a sensing node of the load cell in one or more of a first, second, and third directions relative to the load cell is disclosed. Additionally, a sensing beam disposed between a base of a load cell and a sensing node of the load cell, the sensing beam configured for sensing a force exerted by a load upon the sensing node in one or more of a first and a second direction relative to the load cell, is disclosed. As one example, a plurality of such sensing beams may be disposed within the load cell to enable sensing a force exerted by a load upon the sensing node in one or more of a first, second, and third directions relative to the load cell. For example, the respective first and second directions relative to the load cell in which the force is sensed by each such sensing beam may correspond to any two of the first, second, and third directions relative to the load cell in which the force is sensed by the overall load cell. Finally, a method of sensing a force exerted by a load upon a sensing node of a load cell in one or more of a first, second, and third directions relative to the load cell, is described.

Load cells are among a number of electro-mechanical transducers that may be used to sense a force exerted by a load, such as, for example, a beam, upon a target object. A load cell may be used to sense the force by first coupling a movable sensing portion of the load cell, which may be referred to as "a sensing node," to the target object, and coupling a base portion of the load cell, which may be referred to as "a base," to a fixed, non-movable reference point, e.g., a system chassis. After the force is applied to the target object, and thus to the sensing node, flexible components of the load cell, which may be referred to as "sensing beams," that couple the sensing node to the base and make the sensing node movable with respect to the base, may deform in response to the applied force. For example, the sensing beams may deform by an amount that is proportional to the applied force.

Subsequently, deformation sensors, e.g., strain gages (sometimes referred to as strain "gauges"), disposed on the sensing beams, in conjunction with associated electrical bias and conditioning circuitry, may transform the deformations of the sensing beams into electrical signals indicative of the deformations, and output the signals as a representation of a magnitude of the force applied to the target object. For example, the strain gages may be arranged in a commonly used Wheatstone-Bridge configuration. Additionally, in some examples, the sensing beams may be oriented within the load cell in such a manner that allows a particular subset of the sensing beams to deform in response to a particular component of the applied force, and to not substantially deform in response to all other components of the force. For example, multiple subsets of the sensing beams may be configured within the load cell in this manner, such that each of the subsets of the sensing beams deforms in response to a different component of the applied force. As an example, one or more of the subsets of the sensing beams, each corresponding to a respective component of the applied force, may be configured in the Wheatstone-Bridge configuration described above. In this manner, the load cell may be used to sense not only an overall magnitude of the force applied to the target object, but also a magnitude of each of one or more components of the force that correspond to particular directions with respect to the target object, and, therefore, the load cell. Sensing force in the manner described above may be useful in a variety of applications, including, for example, measurement and calibration, process control, and manufacturing applications, as some examples.

Existing load cells are generally configured to sense force in one or two directions, namely, in one or more of an X-direction and a Y-direction, relative to a particular load cell. Such load cells may be referred to as "low-profile" load cells, since the sensing beams used to sense the force in the one or two directions may be arranged in a low-profile plane (e.g., the X-Y plane) within each load cell. In order to sense force in additional directions, e.g., in the Z-direction, multiple load cells may be combined within a given force sensing application. Alternatively, a more complex "high-profile" load cell may be used that employs additional sensing beams disposed outside of (e.g., perpendicular with respect to) the low-profile plane and configured to deform in response to a component of the force that corresponds to each of the additional directions.

According to the techniques of this disclosure, a "low-profile" load cell comprising a plurality of sensing beams arranged in a low-profile plane (e.g., the X-Y plane) within the load cell may be used to sense a force exerted by a load upon a target object in one or more of a first, second, and third directions relative to the target object. As one example, each of the sensing beams disposed within the load cell may be configured to enable sensing the force exerted by the load upon the target object in any two of the first, second, and third directions relative to the target object. Because a plurality of such sensing beams may be disposed within the load cell in the particular manner described herein, the load cell may be used to sense the force exerted by the load upon the target object in the one or more of the first, second, and third directions relative to the target object.

Figure 1:
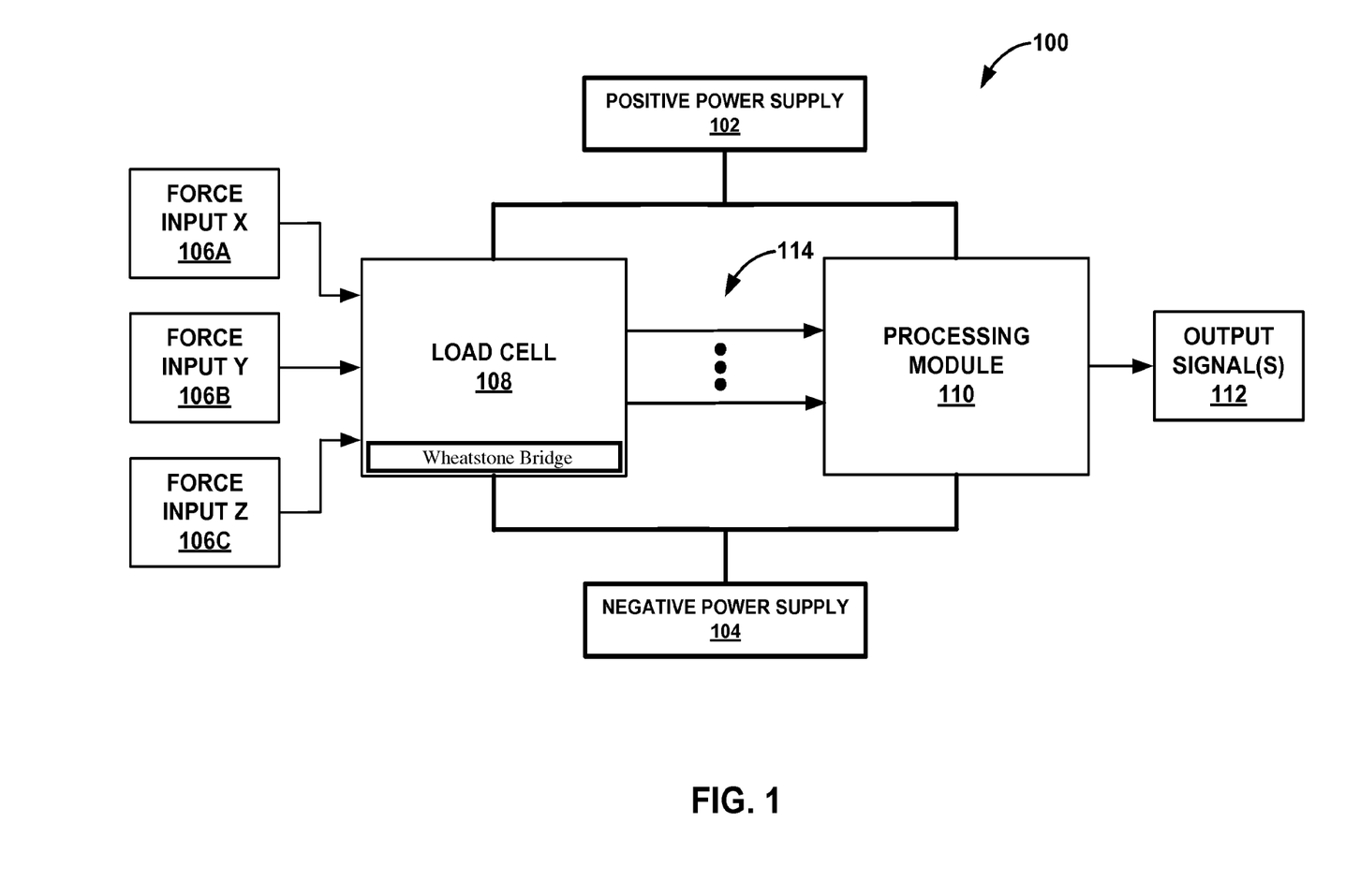
FIG. 1 is a block diagram that illustrates one example of a sensing system for sensing a force exerted by a load upon a load cell in one or more of a first, second, and third directions relative to the load cell, consistent with the techniques of this disclosure.

FIG. 1 is a block diagram that illustrates one example of a sensing system 100 for sensing a force (e.g., one or more of a force input X 106A, force input Y 106B, and force input Z 106C) exerted by a load upon a load cell 108 in one or more of a first, second, and third directions (e.g., X-, Y-, and Z-directions within a three-dimensional coordinate system) relative to load cell 108, consistent with the techniques of this disclosure. The first, second and third directions may be perpendicular to one another so as to essentially define a three-dimensional coordinate system. As shown in FIG. 1, sensing system 100 includes a positive power supply 102, a negative power supply 104, force input X 106A, force input Y 106B, force input Z 106C, load cell 108, load cell output signal(s) 114, a processing module 110, and one or more output signal(s) 112.

Sensing system 100 may be an electro-mechanical system or device of any kind, including any combination of mechanical structural components and hardware, electro-mechanical transducers, discrete electronic components, digital and/or analog circuitry, and mechanical and electronic sub-systems or sub-devices of any kind. Examples of processing module 110 are described in greater detail below. Examples of load cell 108 are described in greater detail below, and with reference to FIGS. 2 and 3.

In the example of FIG. 1, each of force inputs X, Y, Z 106A-106C may comprise a component of a force exerted by a load upon a sensing node (not shown) of load cell 108 that corresponds to a respective one of a first, second, and third direction relative to load cell 108. For example, the first, second, and third directions may correspond to the X-, Y-, and Z-directions relative to load cell 108. As explained in greater detail below with reference to FIGS. 2-4, the X-, Y-, and Z-directions relative to load cell 108 may in turn correspond to left/right, upward/downward, and inward/outward directions relative to load cell 108 (e.g., relative to a front view of load cell 108), respectively.

Sensing system 100, and in particular, load cell 108, may convert force inputs X, Y, Z 106A-106C from force components (i.e., forces) to electrical signals in order to generate load cell output signal(s) 114. For example, load cell output signal(s) 114 may comprise one or more voltage and/or current signals indicative of magnitudes of force inputs X, Y, Z 106A-106C. As will be described in greater detail below, the magnitudes of force inputs X, Y, Z 106A-106C, as indicated by load cell output signal(s) 114, may correspond to changes in resistance of one or more strain gages (not shown) of load cell 108. Furthermore, processing module 110 may process load cell output signal(s) 114 to generate output signal(s) 112. Output signal(s) 112 may comprise any combination of analog and/or digital signals or other information used to represent the magnitude and direction of the force applied to the target object. For example, output signal(s) 112 may comprise vector information, including information indicating both the magnitude and the direction of the applied force, or information indicating magnitudes of multiple discrete force components that correspond to the various directions in which the force is applied to the target object. In any case, processing module 110 may process load cell output signal(s) 114 (e.g., filter, scale, normalize, level-shift, etc.,) in any manner to generate output signal(s) 112.

Processing module 110 may comprise any suitable arrangement of hardware, software, firmware, or any combination thereof, to perform the techniques attributed to processing module 110 in this disclosure. In general, processing module 110 may include any of one or more microprocessors, microcontrollers, digital signal processors (DSPs), application specific integrated circuits (ASICs), field programmable gate arrays (FPGAs), or any other equivalent integrated or discrete logic circuitry, as well as any combination of such components. Furthermore, processing module 110 may include various types of analog circuitry, in addition to, or in place of, the logic devices and circuitry described above. It should be noted that processing module 110 is depicted as a part of sensing system 100 for purposes of illustration only. In other examples, sensing system 100 may not include processing module 110. In such examples, output signal(s) 112 may directly comprise load cell output signal(s) 114. In other words, an output of sensing system 100, i.e., output signal(s) 112, may comprise an output of load cell 108 itself, i.e., load cell output signal(s) 114, which may be output for further processing by another system or device (e.g., a programmable logic controller (PLC), or another computing device).

Additionally, positive power supply 102 and negative power supply 104 may each comprise any power supply unit, module, or circuitry also included within sensing system 100, which may, in some examples, be integrated with load cell 108 and/or processing module 110 within a common enclosure, or on a common printed circuit board (PCB).

Although positive power supply 102, negative power supply 104, force inputs X, Y, Z 106A-106C, load cell 108, load cell output signal(s) 114, processing module 110, and output signal(s) 112 of sensing system 100 are described as separate units or modules for conceptual purposes, in some examples, any combination of these components of sensing system 100 may be functionally integrated within a common enclosure or housing.

Additionally, in this disclosure, any reference made to a memory, or a memory device, used to store instructions, data, or other information, includes any volatile or non-volatile media, such as random access memory (RAM), read only memory (ROM), non-volatile RAM (NVRAM), electrically erasable programmable ROM (EEPROM), flash memory, and the like. In some examples, one or more memory devices may be external to sensing system 100 and/or processing module 110, for example, external to an enclosure or a common PCB used to enclose or house sensing system 100 and/or processing module 110. In other examples, the one or more memory devices may be internal to sensing system 100 and/or processing module 110, e.g., included within a common enclosure or on a common PCB.

According to the techniques of this disclosure, as one example, load cell 108 may include a plurality of sensing beams disposed between a sensing node and a base of load cell 108, and a first one or more strain gages disposed upon a first one or more of the plurality of sensing beams, wherein each of the first one or more strain gages is positioned perpendicularly with respect to the first direction (e.g., a left/right, or X-direction), and wherein the first one or more of the plurality of sensing beams and the first one or more strain gages disposed thereon deform in response to a component of the force that corresponds to the first direction (e.g., force input X 106A).

Similarly, load cell 108 may further include a second one or more strain gages disposed upon a second one or more of the plurality of sensing beams, wherein each of the second one or more strain gages is positioned perpendicularly with respect to the second direction (e.g., an upward/downward, or Y-direction), and perpendicularly with respect to each of the first one or more strain gages, and wherein the second one or more of the plurality of sensing beams and the second one or more strain gages disposed thereon deform in response to a component of the force that corresponds to the second direction (e.g., force input Y 106B).

Finally, load cell 108 may still further include a third one or more strain gages disposed upon at least one of the first and second one or more of the plurality of sensing beams, wherein each of the third one or more strain gages is positioned perpendicularly with respect to the third direction (e.g., an inward/outward, or Z-direction), and perpendicularly with respect to each of the first and second one or more strain gages, and wherein the at least one of the first and second one or more of the plurality of sensing beams and the third one or more strain gages disposed thereon deform in response to a component of the force that corresponds to the third direction (e.g., force input Z 106C).

In this manner, sensing system 100 of FIG. 1 represents an example of a sensing system that includes a load cell for sensing a force exerted by a load upon a sensing node of the load cell in one or more of a first, second, and third directions relative to the load cell, the load cell comprising a plurality of sensing beams disposed between the sensing node and a base of the load cell, a first one or more strain gages disposed upon a first one or more of the plurality of sensing beams, wherein each of the first one or more strain gages is positioned perpendicularly with respect to the first direction, and wherein the first one or more of the plurality of sensing beams and the first one or more strain gages disposed thereon deform in response to a component of the force that corresponds to the first direction, a second one or more strain gages disposed upon a second one or more of the plurality of sensing beams, wherein each of the second one or more strain gages is positioned perpendicularly with respect to the second direction, and perpendicularly with respect to each of the first one or more strain gages, and wherein the second one or more of the plurality of sensing beams and the second one or more strain gages disposed thereon deform in response to a component of the force that corresponds to the second direction, and a third one or more strain gages disposed upon at least one of the first and second one or more of the plurality of sensing beams, wherein each of the third one or more strain gages is positioned perpendicularly with respect to the third direction, and perpendicularly with respect to each of the first and second one or more strain gages, and wherein the at least one of the first and second one or more of the plurality of sensing beams and the third one or more strain gages disposed thereon deform in response to a component of the force that corresponds to the third direction.

Figure 2:
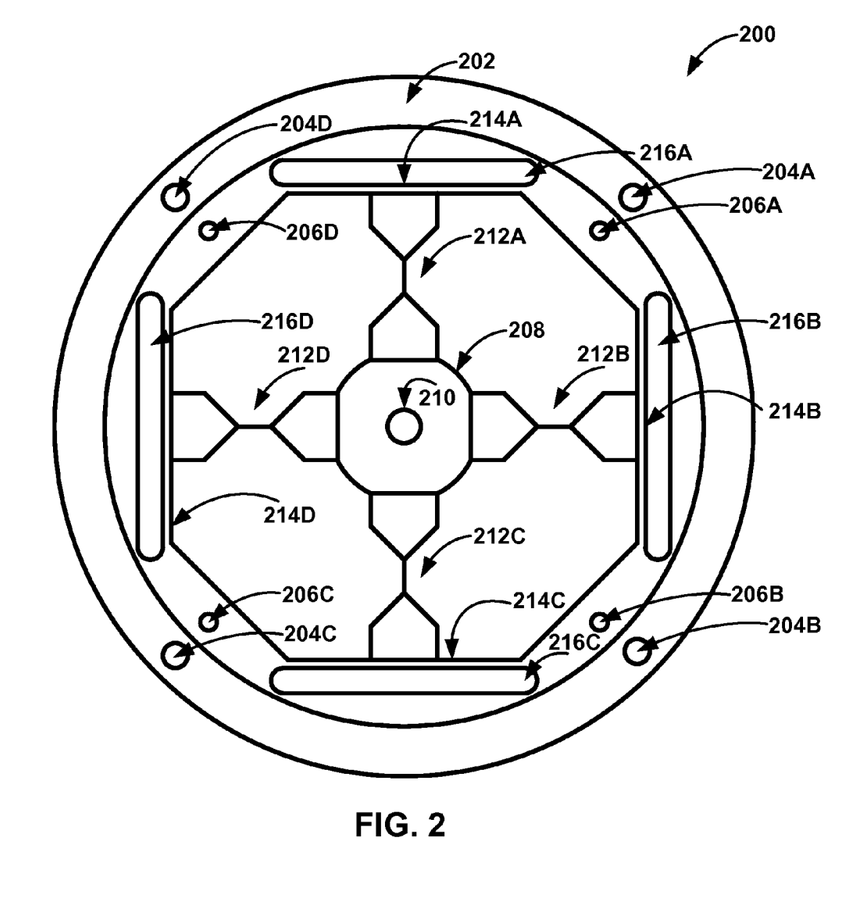
FIG. 2 is a conceptual diagram that illustrates a front view of one example of a load cell that may be used in conjunction with the sensing system of FIG. 1, consistent with the techniques of this disclosure.

FIG. 2 is a conceptual diagram that illustrates a front view of one example of a load cell 200 that may be used in conjunction with sensing system 100 of FIG. 1, consistent with the techniques of this disclosure. In other words, load cell 200 represents one example of load cell 108 depicted in FIG. 1. As shown in FIG. 2, load cell 200 includes a base 202, a plurality of mounting couplings 204A-204D and 206A-206D disposed within base 202, a plurality of isolating structures 214A-214D (which may also be referred to as "flexures") and a plurality of cut-outs 216A-216D also disposed within base 202, a sensing node 208, a beam coupling 210 disposed within sensing node 208, and a plurality of sensing beams 212A-212D disposed between sensing node 208 and base 202 via isolating structures 214A-214D. For example, base 202, mounting couplings 204A-204D and 206A-206D, isolating structures 214A-214D, cut-outs 216A-216D, sensing node 208, beam coupling 210, and sensing beams 212A-212D may comprise a contiguous piece of structural material (e.g., metallic or plastic material that is machined, molded, or otherwise manipulated to form load cell 200), or a plurality of discrete components assembled together to form load cell 200.

In the example of FIG. 2, base 202 may comprise part of an enclosure or housing of load cell 200. Furthermore, mounting couplings 204A-204D and 206A-206D may be configured for mounting load cell 200, via base 202, within another structure, such as a system (e.g., sensing system 100 of FIG. 1) enclosure or housing, or a system chassis. In some examples, mounting couplings 204A-204D and 206A-206D may comprise thread couplings, clamp couplings, or another type of couplings.

In the example of FIG. 2, sensing node 208 may be a point of contact used to couple a force to be sensed using load cell 200. For example, the force may be coupled to sensing node 208 using beam coupling 210, which may comprise a thread coupling, clamp coupling, or another type of coupling. Additionally, as shown in FIG. 2, sensing beams 212A-212D each comprise multiple sections, as will be described in greater detail below with reference to the sensing beam 400 of FIG. 4. Furthermore, the multiple sections of each of sensing beams 212A-212D may include one or more strain gages disposed thereon, as will also be described in greater detail below with reference to the sensing beam 400 of FIG. 4.

In the example of FIG. 2, isolating structures, or "flexures," 214A-214D may include any structure and/or material that may prevent or substantially reduce deformation of sensing beams 212A-212D in one or more directions, such that sensing beams 212A-212D deform in response to a component of a force in one direction, and do not substantially deform in response to a component of the force in another direction, relative to sensing beams 212A-212D.

In particular, in the example of FIG. 2, isolating structures 214A and 214C may be configured to enable sensing beams 212A and 212C to deform in response to components of the force that correspond to a left/right direction and an inward/outward (i.e., in and out of the page) direction, while preventing sensing beams 212A and 212C from substantially deforming in response to a component of the force that corresponds to an upward/downward direction, relative to sensing beams 212A and 212C. In other words, isolating structures 214A and 214C may be configured to substantially absorb the component of the force that corresponds to the upward/downward direction, such that sensing beams 212A and 212C do not substantially deform in response to this component of the force. In this example, isolating structures 214A and 214C may be referred to as "soft" in the upward/downward direction, and "stiff" in the left/right and inward/outward directions. Similarly, isolating structures 214B and 214D may be configured to enable sensing beams 212B and 212D to deform in response to the components of the force that correspond to the upward/downward direction and the inward/outward direction, while preventing sensing beams 212B and 212D from substantially deforming in response to the component of the force that corresponds to the left/right direction, relative to sensing beams 212B and 212D. Once again, isolating structures 214B and 214D may be configured to substantially absorb the component of the force that corresponds to the left/right direction, such that sensing beams 212B and 212D do not substantially deform in response to this component of the force. In this example, isolating structures 214B and 214D may be referred to as "soft" in the left/right direction, and "stiff" in the upward/downward and inward/outward directions.

For example, each of isolating structures 214A-214D may derive the above-described directional properties of softness and stiffness as a result of the corresponding cut-outs 216A-216D. In particular, each of cut-outs 216A-216D may enable the corresponding one of isolating structures 214A-214D to remain soft (i.e., deform into and out of, or away from, the respective cut-out) in response to a component of the force in one direction (e.g., a direction not sensed by a corresponding one of sensing beams 212A-212D), and to remain stiff (i.e., not substantially deform) in response to a component of the force in one or more other directions (e.g., directions sensed by the corresponding one of sensing beams 212A-212D).

Furthermore, as depicted in the example of FIG. 2, isolating structures 214A-214D comprise part of base 202, as previously described, wherein cut-outs 216A-216D are disposed within isolating structures 214A-214D, and thereby within base 202, as also previously described. In other words, in the example of FIG. 2, cut-outs 216A-216D are used to form isolating structures 214A-214D. In other examples, isolating structures 214A-214D and cut-outs 216A-216D may have different geometries and/or orientations with respect to one another, and with reference to base 202 and sensing beams 212A-212D.

In other examples, one or more components of sensing node 208, as well as transitions and/or interconnects (not shown) included within each of sensing beams 212A-212D, which are described in greater detail below with reference to FIG. 4, may also have similar isolating properties as those described above with reference to isolating structures 214A-214D. For example, the one or more components of sensing node 208, the transitions, and/or the interconnects may also be configured to substantially absorb the components of the force that correspond to the upward/downward direction and the left/right direction, such that the corresponding sensing beams of sensing beams 212A-212D do not substantially deform in response to these components of the force.

According to the techniques of this disclosure, load cell 200 may be configured for sensing a force exerted by a load upon sensing node 208 of load cell 200 in one or more of a first, second, and third directions (e.g., the left/right, upward/downward, and inward/outward directions) relative to load cell 200. As one example, load cell 200 may include a plurality of sensing beams 212A-212D disposed between sensing node 208 and base 202 of load cell 200. In this example, a first one or more strain gages (not shown) may be disposed upon a first one or more of the plurality of sensing beams (e.g., one or more of sensing beams 212A and 212C), wherein each of the first one or more strain gages is positioned perpendicularly with respect to the first direction (e.g., the left/right direction), and wherein the first one or more of the plurality of sensing beams and the first one or more strain gages disposed thereon deform in response to a component of the force that corresponds to the first direction.

Also in this example, a second one or more strain gages (also not shown) disposed upon a second one or more of the plurality of sensing beams (e.g., one or more of sensing beams 212B and 212D), wherein each of the second one or more strain gages is positioned perpendicularly with respect to the second direction (e.g., the upward/downward direction) with respect to load cell 200, and perpendicularly with respect to each of the first one or more strain gages, and wherein the second one or more of the plurality of sensing beams and the second one or more strain gages disposed thereon deform in response to a component of the force that corresponds to the second direction.

Also in this example, a third one or more strain gages (also not shown) may be disposed upon at least one of the first and second one or more of the plurality of sensing beams (e.g., one or more of sensing beams 212A-212D), wherein each of the third one or more strain gages is positioned perpendicularly with respect to the third direction (e.g., the inward/outward direction), and perpendicularly with respect to each of the first and second one or more strain gages, and wherein the at least one of the first and second one or more of the plurality of sensing beams and the third one or more strain gages disposed thereon deform in response to a component of the force that corresponds to the third direction.

In another example, load cell 200 may further comprise a processing module (e.g., processing module 110 of FIG. 1) configured to, for each strain gage of the first, second, and third one or more strain gages, determine an amount of deformation of the respective strain gage while the force is exerted by the load upon sensing node 208 of load cell 200, and determine the force in the one or more of the first, second, and third directions based on the amount of deformation of each strain gage.

In still another example, the processing module may be further configured to, for each strain gage of the first, second, and third one or more strain gages, determine a nominal resistance of the respective strain gage while no load is exerted upon sensing node 208 of load cell 200, and wherein to determine the amount of deformation of the strain gage while the force is exerted by the load upon sensing node 208 of load cell 200, the processing module is configured to determine a loaded resistance of the strain gage while the load is exerted upon sensing node 208 of load cell 200, and determine the amount of deformation of the strain gage based on one or more of a difference between the loaded resistance and the nominal resistance, a difference between a voltage across the loaded resistance and a voltage across the nominal resistance, and a difference between a current passing through the loaded resistance and a current passing through the nominal resistance.

In still another example, to determine the force in the one or more of the first, second, and third directions based on the amount of deformation of each strain gage, the processing module may be configured to determine the force in the first direction based on an amount of deformation of each strain gage of the first one or more strain gages, determine the force in the second direction based on an amount of deformation of each strain gage of the second one or more strain gages, and determine the force in the third direction based on an amount of deformation of each strain gage of the third one or more strain gages.

In still another example, each of the first, second, and third one or more strain gages may be configured to deform in response to the component of the force that corresponds to the respective one of the first, second, and third directions, and may be configured to not substantially deform in response to the components of the force that correspond to the remaining directions. In other words, each of the first, second, and third one or more strain gages may be configured to substantially deform only in response to the component of the force that corresponds to the respective one of the first, second, and third directions, e.g., using isolating structures 214A-214D to substantially absorb the components of the force that correspond to the remaining directions in each instance.

In still another example, one or more of the first, second, and third one or more strain gages may each include at least two strain gages. In this example, two strain gages of each of the one or more of the first, second, and third one or more strain gages may be disposed upon each sensing beam of the respective one or more of the first and second one or more of the plurality of sensing beams 212A-212D upon which the respective one of the first, second, and third one or more strain gages is disposed. In other words, each sensing beam of sensing beams 212A-212D which includes one or more strain gages configured for sensing the component of the force that corresponds to the first direction may include two such strain gages, as one example. Similarly, each sensing beam of sensing beams 212A-212D which includes one or more strain gages configured for sensing the component of the force that corresponds to the second direction also may include two such strain gages.

In still another example, the third one or more strain gages may comprise at least four strain gages. In this example, four strain gages of the third one or more strain gages may be disposed upon each sensing beam of the at least one of the first and second one or more of the plurality of sensing beams 212A-212D upon which the third one or more strain gages are disposed. In other words, each sensing beam of sensing beams 212A-212D which includes one or more strain gages configured for sensing the component of the force that corresponds to the third direction may include four such strain gages, as one example.

Finally, in still another example, the one or more of the first, second, and third one or more strain gages may be configured in one of a Wheatstone-Bridge configuration, a Half-Bridge configuration, a Quarter-Bridge configuration, and a resistive divider configuration in conjunction with one or more resistive elements each having a substantially fixed resistance, as previously described.

In this manner, load cell 200 of FIG. 2 represents an example of a load cell for sensing a force exerted by a load upon a sensing node of the load cell in one or more of a first, second, and third directions relative to the load cell, the load cell comprising a plurality of sensing beams disposed between the sensing node and a base of the load cell, a first one or more strain gages disposed upon a first one or more of the plurality of sensing beams, wherein each of the first one or more strain gages is positioned perpendicularly with respect to the first direction, and wherein the first one or more of the plurality of sensing beams and the first one or more strain gages disposed thereon deform in response to a component of the force that corresponds to the first direction, a second one or more strain gages disposed upon a second one or more of the plurality of sensing beams, wherein each of the second one or more strain gages is positioned perpendicularly with respect to the second direction, and perpendicularly with respect to each of the first one or more strain gages, and wherein the second one or more of the plurality of sensing beams and the second one or more strain gages disposed thereon deform in response to a component of the force that corresponds to the second direction, and a third one or more strain gages disposed upon at least one of the first and second one or more of the plurality of sensing beams, wherein each of the third one or more strain gages is positioned perpendicularly with respect to the third direction, and perpendicularly with respect to each of the first and second one or more strain gages, and wherein the at least one of the first and second one or more of the plurality of sensing beams and the third one or more strain gages disposed thereon deform in response to a component of the force that corresponds to the third direction.

Figure 3:
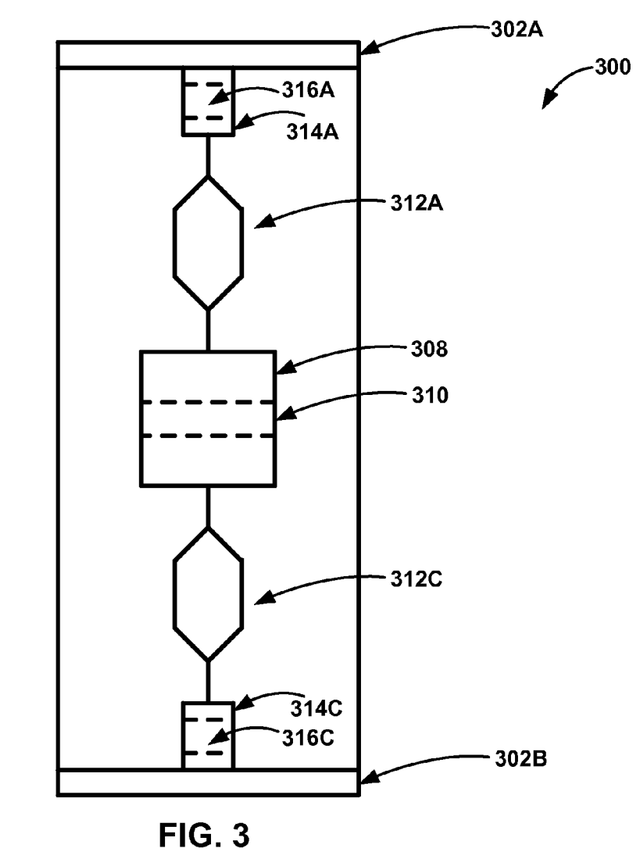
FIG. 3 is a conceptual diagram that illustrates a cross-sectional view of the example load cell of FIG. 2, consistent with the techniques of this disclosure.

FIG. 3 is a conceptual diagram that illustrates a cross-sectional view of the example load cell 200 of FIG. 2, consistent with the techniques of this disclosure. In other words, load cell 300 represents one example of load cell 108 depicted in FIG. 1. As shown in FIG. 3, load cell 300 includes a base 302A and 302B, a plurality of isolating structures 314A and 314C (which may also be referred to as "flexures") and a plurality of cut-outs 316A and 316C (as indicated by dashed lines) disposed within base 302A, 302B, a sensing node 308, a beam coupling 310 (as also indicated by dashed lines) disposed within sensing node 308, and a plurality of sensing beams 312A and 312C disposed between base 302A, 302B and sensing node 308, via isolating structures 314A, 314C.

In the example of FIG. 3, base 302A, 302B is depicted using two portions (i.e., 302A, 302B) as necessitated by the cross-sectional view of load cell 300, although it should be understood that base 302A, 302B comprises a single base, e.g., base 202 of FIG. 2. Additionally, the cross-sectional view of load cell 300 depicts only two sensing beams, i.e., sensing beams 312A and 312C, and only two isolating structures, or "flexures," and corresponding cut-outs, i.e., isolating structures 314A and 314C and cut-outs 316A and 316C, respectively. It should also be understood that load cell 300 comprises four sensing beams, e.g., 212A-212D, and four isolating structures, e.g., 214A-214D, and corresponding cut-outs, e.g., 216A-216D, as described above with reference to FIG. 2.

Furthermore, as depicted in the example of FIG. 3, isolating structures 314A, 314C comprise part of base 302A, 302B, as previously described, wherein cut-outs 316A, 316C are disposed within isolating structures 314A, 314C, and thereby within base 302A, 302B, as also previously described. In other words, in the example of FIG. 3, cut-outs 316A, 316C are used to form isolating structures 314A, 314C. In other examples, isolating structures 314A, 314C and cut-outs 316A, 316C may have different geometries and/or orientations with respect to one another, and with reference to base 302A, 302B and sensing beams 312A, 312C.

Finally, as shown in FIG. 3, sensing beams 312A, 312C each comprise multiple sections which may each include one or more strain gages disposed thereon, as will be described in greater detail below with reference to the sensing beam 400 of FIG. 4. As one example, the one or more strain gages disposed on a particular section (e.g., on one or more surfaces of the section, such as top and bottom surfaces) of one of sensing beams 312A, 312C may be configured in the Wheatstone-Bridge configuration described above, along with one or more other strain gages disposed on one or more corresponding sections of the one of sensing beams 312A, 312C and/or the other one of sensing beams 312A, 312C. Alternatively, the one or more strain gages disposed on a particular section of either of sensing beams 312A, 312C may be configured in a similar Half-Bride or Quarter-Bridge configuration, along with one or more resistive elements (e.g., precision resistors), each having a substantially fixed resistance, that are disposed elsewhere (e.g., within bias circuitry used to provide electrical bias, or "excitation," for the one or more strain gages). As still another example, the one or more strain gages disposed on the particular section of either of sensing beams 312A, 312C may be electrically configured in another manner, e.g., as one or more resistive divider circuits in conjunction with one or more resistive elements each having a substantially fixed resistance. For example, the one or more strain gages may comprise a single strain gage, or an "array" of strain gauges, that are electrically configured in a configuration other than the bridge configurations described above.

As shown in FIG. 3, and as described above with reference to sensing beams 212A-212D, the multiple sections of sensing beams 312A, 312C are perpendicular with respect to one another. For example, the inner section (i.e., "first section") and the outer sections (i.e., "bifurcated second section") of each of sensing beams 312A, 312C, are perpendicular with respect to one another, as also will be described in greater detail below with reference to the sensing beam 400 of FIG. 4.

In this manner, load cell 300 of FIG. 3 represents an example of a load cell for sensing a force exerted by a load upon a sensing node of the load cell in one or more of a first, second, and third directions relative to the load cell, the load cell comprising a plurality of sensing beams disposed between the sensing node and a base of the load cell, a first one or more strain gages disposed upon a first one or more of the plurality of sensing beams, wherein each of the first one or more strain gages is positioned perpendicularly with respect to the first direction, and wherein the first one or more of the plurality of sensing beams and the first one or more strain gages disposed thereon deform in response to a component of the force that corresponds to the first direction, a second one or more strain gages disposed upon a second one or more of the plurality of sensing beams, wherein each of the second one or more strain gages is positioned perpendicularly with respect to the second direction, and perpendicularly with respect to each of the first one or more strain gages, and wherein the second one or more of the plurality of sensing beams and the second one or more strain gages disposed thereon deform in response to a component of the force that corresponds to the second direction, and a third one or more strain gages disposed upon at least one of the first and second one or more of the plurality of sensing beams, wherein each of the third one or more strain gages is positioned perpendicularly with respect to the third direction, and perpendicularly with respect to each of the first and second one or more strain gages, and wherein the at least one of the first and second one or more of the plurality of sensing beams and the third one or more strain gages disposed thereon deform in response to a component of the force that corresponds to the third direction.

Figure 4:
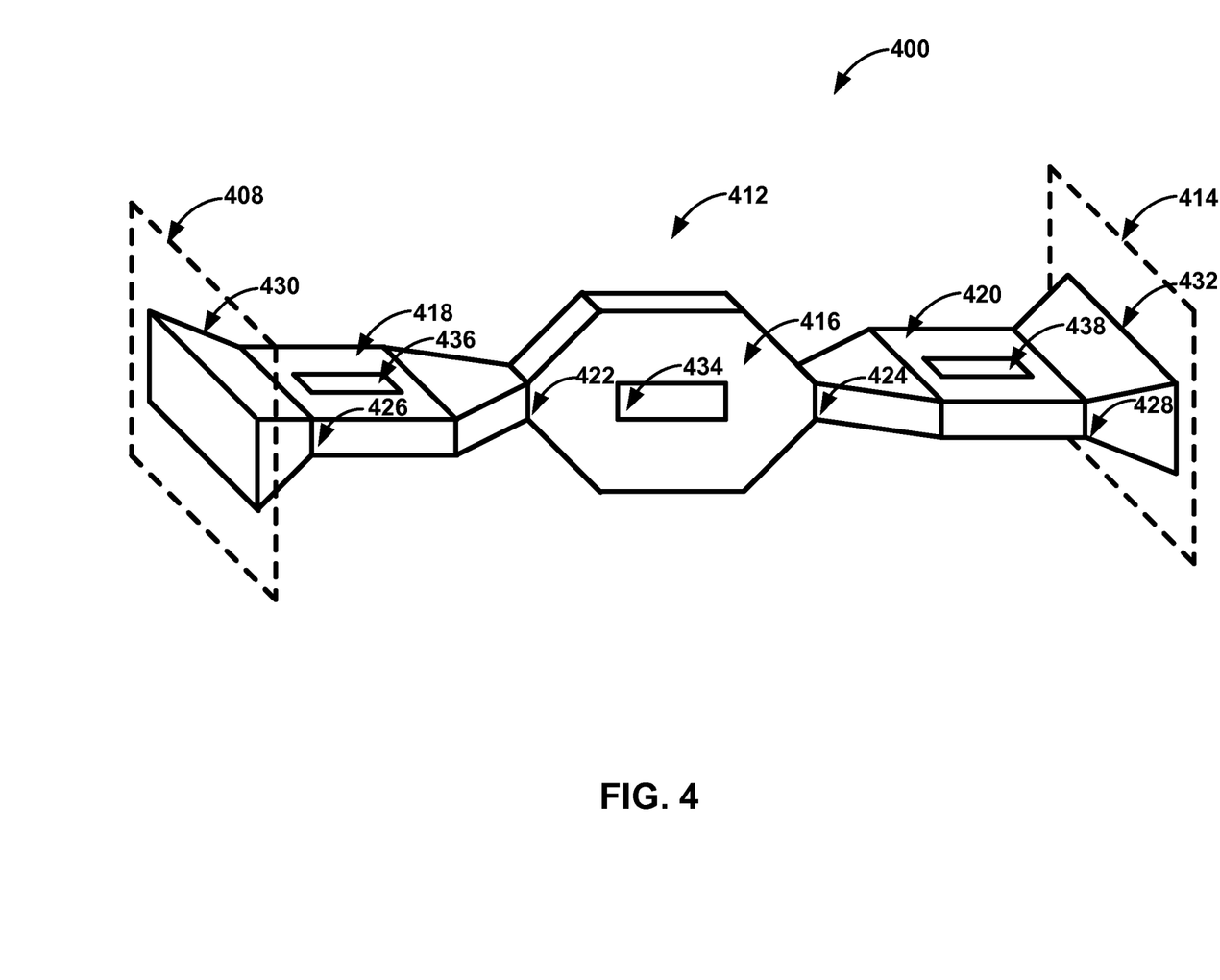
FIG. 4 is a conceptual diagram that illustrates a perspective view of one example of a sensing beam that may be used in conjunction with the example load cells of FIGS. 1, 2, and 3, consistent with the techniques of this disclosure.

FIG. 4 is a conceptual diagram that illustrates a perspective view of one example of a sensing beam 412 that may be used in conjunction with the example load cells of FIGS. 1, 2, and 3, consistent with the techniques of this disclosure. In other words, sensing beam 412 may be disposed within a load cell 400, which may in turn correspond to any of load cells 108, 200 and 300 described above.

As shown in the example of FIG. 4, sensing beam 412 is disposed between a sensing node 408 and an isolating structure 414 (which may also be referred to as a "flexure"). As previously described with reference to sensing node 208 and sensing node 308 of FIGS. 2 and 3, respectively, sensing node 408 may be a point of contact used to couple a force to be sensed using load cell 400. For example, the force may be coupled to sensing node 408 using a beam coupling, such as beam coupling 210 and beam coupling 310 described above with reference to FIGS. 2 and 3, respectively. As described above, such a beam coupling may include a thread coupling, a clamp coupling, or another type of coupling.

As also previously described with reference to isolating structures 214A-214D and isolating structures 314A, 314C of FIGS. 2 and 3, respectively, isolating structure, or "flexure," 414 may include any structure and/or material that may prevent or substantially reduce deformation of sensing beam 412 in one or more directions, such that sensing beam 412 deforms in response to a component of a force in one direction, and does not substantially deform in response to a component of the force in another direction, relative to sensing beam 412. In the example of FIG. 4, isolating structure 414 may be configured to enable sensing beam 412 to deform in response to components of the force that correspond to an upward/downward direction and an inward/outward (i.e., in and out of the page) direction, while preventing sensing beam 412 from substantially deforming in response to a component of the force that corresponds to a left/right direction, relative to sensing beam 412. In other words, isolating structure 414 may be configured to substantially absorb the component of the force that corresponds to the left/right direction, such that sensing beam 412 does not substantially deform in response to this component of the force.

In still other examples, one or more components of sensing node 408, transitions 430 and 432, and/or interconnects 422, 424, 426, and 428, which are described in greater detail below, may also have similar isolating properties as those described above with reference to isolating structure 414. For example, the one or more components of sensing node 408, transitions 430, 432, and/or interconnects 422, 424, 426, and 428 may also be configured to substantially absorb the component of the force that corresponds to the left/right direction, such that sensing beam 412 does not substantially deform in response to this component of the force.

As also shown in the example of FIG. 4, sensing beam 412 includes transitions 430 and 432. For example, transitions 430, 432 may comprise structures and/or materials used to connect sensing beam 412 to the overall structure of load cell 400 (i.e., to sensing node 408 and isolating structure 414), via interconnects 426 and 428, such that sensing beam 412 may be disposed between sensing node 408 and isolating structure 414, as described above. Transitions 430, 432 as depicted in FIG. 4 are merely examples of geometries of structures that may be used to connect sensing beam 412 to sensing node 408 and isolating structure 414. In other examples, other geometries of structures may be used to connect sensing beam 412 to the overall structure of load cell 400.

In some examples, transitions 430, 432 may enable one or more of first section 416 and bifurcated second section 418, 420, which are also described in greater detail below, to deform in response to the components of the force that correspond to the upward/downward and inward/outward directions, while preventing the one or more of first section 416 and bifurcated second section 418, 420 from substantially deforming in response to the component of the force that corresponds to the left/right direction, relative to sensing beam 412, as described above. Additionally, as also described above, transitions 430 and 432 may also be configured to substantially absorb the component of the force that corresponds to the left/right direction, such that sensing beam 412 does not substantially deform in response to this component of the force.

In other examples, transitions 430, 432 may not serve the particular functional purposes described above, and may instead aid manufacturability of sensing beam 412 and/or load cell 400. For example, transitions 430, 432 may enable manufacturing of sensing beam 412 (e.g., molding, milling, welding, etc.) and/or assembly of sensing beam 412 into load cell 400 (e.g., automated placement, soldering, welding, etc.). In still other examples, sensing beam 412 may not include one or more of transitions 430, 432. In other words, one or more sub-sections of bifurcated second section 418, 420 of sensing beam 412 may be directly connected to sensing node 408 and/or isolating structure 414 without using any transitional structures or materials.

As also shown in the example of FIG. 4, sensing beam 412 includes a first section 416 and a bifurcated second section 418, 420. As shown in FIG. 4, first section 416 and each sub-section of bifurcated second section 418, 420 are connected using interconnects 422 and 424. First section 416, bifurcated second section 418, 420, and interconnects 422, 424 as depicted in FIG. 4 are merely examples of geometries of structures that may be used as first section 416 and bifurcated second section 418, 420, and to connect first section 416 and bifurcated second section 418, 420. In other examples, other geometries of structures may be used as first section 416 and bifurcated second section 418, 420, and to connect the respective sections. For example, first section 416 and the sub-sections of bifurcated second section 418, 420 of sensing beam 412 are perpendicular with respect to one another, as described above with reference to sensing beams 312A, 312C of FIG. 3.

In a similar manner as described above with reference to transitions 430, 432, in some examples, interconnects 422, 424, 426, and 428 may enable one or more of first section 416 and bifurcated second section 418, 420 to deform in response to the components of the force that correspond to the upward/downward and inward/outward directions, while preventing the one or more of first section 416 and bifurcated second section 418, 420 from substantially deforming in response to the component of the force that corresponds to the left/right direction, relative to sensing beam 412. Additionally, as also described above, interconnects 422, 424, 426, and 428 may also be configured to substantially absorb the component of the force that corresponds to the left/right direction, such that first section 416 and bifurcated second section 418, 420 do not substantially deform in response to this component of the force.

Finally, as also shown in the example of FIG. 4, sensing beam 412 includes strain gages 434, 436, and 438 disposed upon first section 416 and bifurcated second section 418, 420. As previously described with reference to FIGS. 1-3, each of strain gages 434, 436, 438 may deform along with sensing beam 412, i.e., along with the respective one of first section 416 and bifurcated second section 418, 420 upon which the respective one of strain gages 434, 436, 438 is disposed. Stated another way, one or more of strain gages 434, 436, 438 may deform in response to the components of the force that correspond to the upward/downward and inward/outward directions, while not substantially deforming in response to the component of the force that corresponds to the left/right direction, relative to sensing beam 412, as described above.

In particular, in the example of FIG. 4, strain gage 434 may deform in response to the component of the force that correspond to the inward/outward direction, while not substantially deforming in response to the components of the force that correspond to the upward/downward and left/right directions. Similarly, each of strain gages 436, 438 may deform in response to the component of the force that correspond to the upward/downward direction, while not substantially deforming in response to the components of the force that correspond to the inward/outward and left/right directions.

Although not shown in FIG. 4, sensing beam 412 may also include strain gages disposed on either surface of each of first section 416 and bifurcated second section 418, 420 of strain gage 412. For example, first section 416 may include strain gage 434 on one surface of first section 416, as shown, as well as another strain gage (not shown) on the opposite surface of first section 416. Similarly, each sub-section of bifurcated second section 418, 420 may include strain gage 436 and strain gage 438, respectively, on one surface of the respective sub-section, as also shown, as well as another strain gage (not shown) on the opposite surface of the sub-section. In some examples, only one sub-section (e.g., 418 or 420) of bifurcated second section 418, 420 may include strain gages, for example, one strain gage on the one surface, and/or another strain gage on the opposite surface.

Furthermore, because, according to the techniques of this disclosure, a plurality of sensing beams may be disposed within each load cell, some sensing beams may not include any strain gages. Accordingly, consistent with the techniques disclosed herein, in some examples, a particular sensing beam (e.g., 412) of a load cell (e.g., 108, 200, 300, 400) may include as few as no strain gages, and as many as six strain gages, disposed upon the sensing beam. Additionally, because a particular strain gage may comprise one or more portions, in other examples consistent with the techniques of this disclosure, a particular sensing beam may include any number of strain gages, or strain gage portions, disposed upon the sensing beam.

Furthermore, in general, according to the techniques of this disclosure, any number of strain gages may be disposed upon any number of sensing beams of a particular load cell, so long as at least one strain gage is disposed upon a sensing beam for each direction in which the force is being sensed. In other words, in examples where the force is being sensed in one or more of a first, second, and third directions relative to the load cell, the load cell will include, for each direction, at least one strain gage disposed upon a sensing beam positioned perpendicularly with respect to the respective direction, such that the sensing beam and the at least one strain gage disposed thereon deform in response to a component of the force that corresponds to the direction.

As described above with reference to FIG. 3, the one or more strain gages (i.e., strain gauges 434, 436, and 438) disposed on a particular one of first section 416 and bifurcated second section 418, 420 (e.g., on one or more surfaces of each of first section 416 and bifurcated second section 418, 420, such as top and bottom surfaces) of sensing beam 412 may be configured in the Wheatstone-Bridge configuration described above, along with one or more other strain gages disposed on one or more corresponding sections of sensing beam 412, or another sensing beam (e.g., a sensing beam directly opposite of sensing beam 412 within load cell 400). Alternatively, the one or more strain gages disposed on a particular one of first section 416 and bifurcated second section 418, 420 of sensing beam 412 may be configured in a similar Half-Bride or Quarter-Bridge configuration, along with one or more resistive elements each having a substantially fixed resistance, that are disposed elsewhere. As still another example, the one or more strain gages disposed on the particular one of first section 416 and bifurcated second section 418, 420 of sensing beam 412 may be electrically configured in another manner, e.g., as one or more resistive divider circuits in conjunction with one or more resistive elements each having a substantially fixed resistance. For example, the one or more strain gages may comprise a single strain gage, or an "array" of strain gauges, that are electrically configured in a configuration other than the bridge configurations described above.

In this manner, sensing beam 400 of FIG. 4 represents an example of a sensing beam disposed between a base of a load cell and a sensing node of the load cell, the sensing beam configured for sensing a force exerted by a load upon the sensing node in one or more of a first and a second direction relative to the load cell, the sensing beam comprising a first section configured to deform in response to a component of the force that corresponds to the first direction, and a second section configured to deform in response to a component of the force that corresponds to the second direction.

Figure 5:
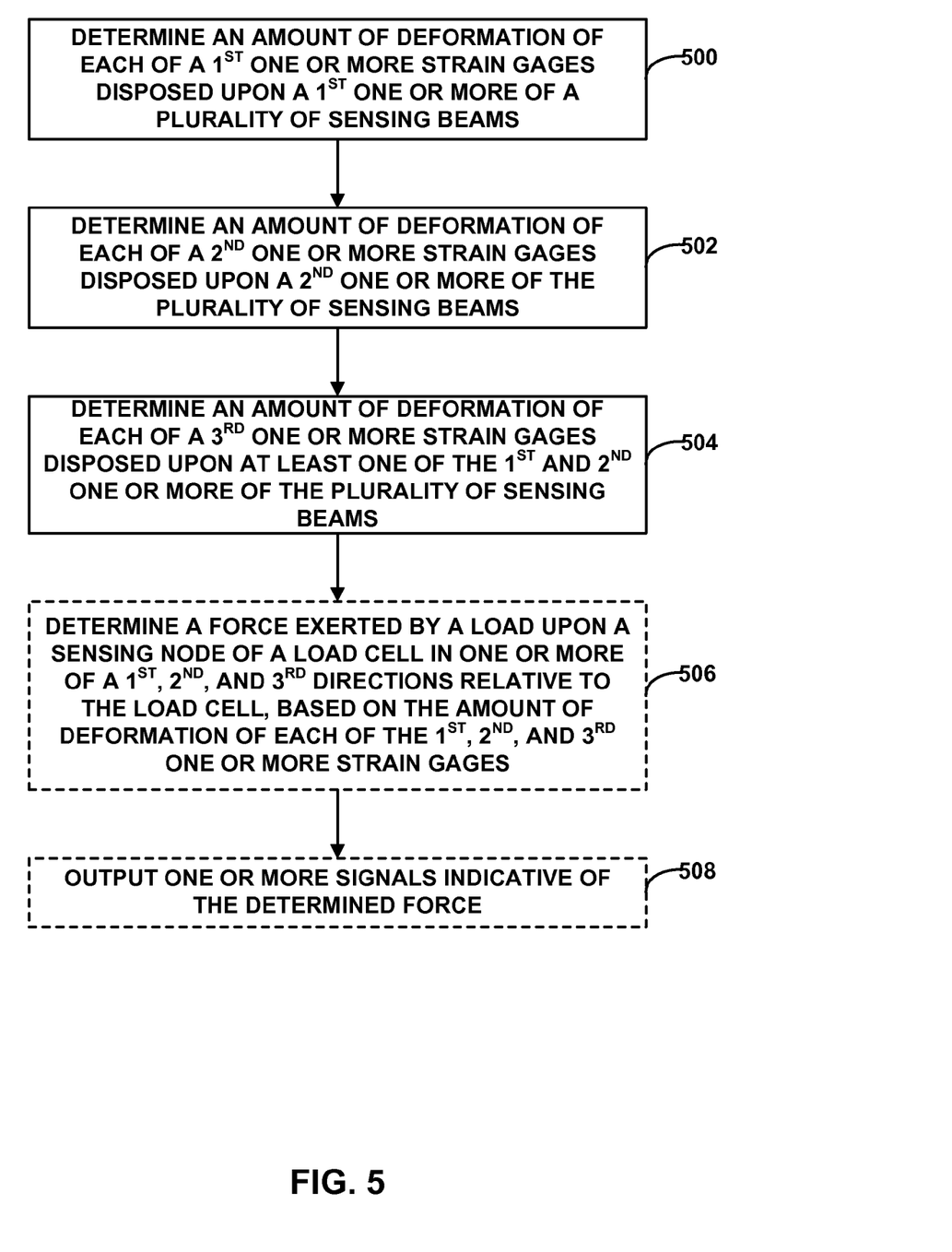
FIG. 5 is a flow diagram that illustrates one example of a method of sensing a force exerted by a load upon a load cell in one or more of a first, second, and third directions, consistent with the techniques of this disclosure.

FIG. 5 is a flow diagram that illustrates one example of a method of sensing a force exerted by a load upon a load cell in one or more of a first, second, and third directions, consistent with the techniques of this disclosure. The techniques of FIG. 5 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 5 are described with respect to sensing system 100 (FIG. 1), load cell 200 (FIG. 2), load cell 300 (FIG. 3), sensing beam 400, as well as various components thereof, although it should be understood that other systems or devices may be configured to perform similar techniques. Moreover, the steps illustrated in FIG. 5 may be performed in a different order or in parallel, and additional steps may be added and certain steps omitted, without departing from the techniques of this disclosure.

In one example, a processing module (e.g., 110) of a sensing system (e.g., 100) that includes the processing module and a load cell (e.g., 108, 200, 300, 400) may be configured to sense a force exerted by a load upon a sensing node (e.g., 208, 308, 408) of the load cell in one or more of a first, second, and third directions relative to the load cell. For example, the processing module may initially determine an amount of deformation of each strain gage of a first one or more strain gages (e.g., 434, 436, 438) disposed upon a first one or more of a plurality of sensing beams (e.g., 212A-212D, 312A, 312C, 412) disposed between the sensing node and a base (e.g., 202, 302A, 302B) of the load cell while the force is exerted by the load upon the sensing node of the load cell (500). In this example, the amount of deformation of the respective strain gage may be indicative of a magnitude of a component of the force that corresponds to the first direction.

In a similar manner as described above, the processing module may further determine an amount of deformation of each strain gage of a second one or more strain gages disposed upon a second one or more of the plurality of sensing beams while the force is exerted by the load upon the sensing node of the load cell. In this example, once again, the amount of deformation of the respective strain gage may be indicative of a magnitude of a component of the force that corresponds to the second direction (502). Finally, the processing module may still further determine an amount of deformation of each strain gage of a third one or more strain gages disposed upon at least one of the first and second one or more of the plurality of sensing beams while the force is exerted by the load upon the sensing node of the load cell. Once again, the amount of deformation of the respective strain gage may be indicative of a magnitude of a component of the force that corresponds to the third direction (504).

In some examples, the processing module may further determine the force in the one or more of the first, second, and third directions based on the amount of deformation of each strain gage of the first, second, and third one or more strain gages (506). As one example, the processing module may, for each strain gage of the first, second, and third one or more strain gages, determine a nominal resistance of the respective strain gage while no load is exerted upon the sensing node of the load cell. For example, the processing module may determine the nominal resistance of the strain gage immediately prior to the load being exerted upon the sensing node of the load cell. Alternatively, the processing module may determine the nominal resistance of the strain gage at another point in time, e.g., at the time of installation of the strain gage within the load cell. In other examples, the processing module may store a value of the nominal resistance of each strain gage within one or more memory devices included within the processing module, or elsewhere within the sensing system. For example, the nominal resistance may be determined based on a manufacturer's specification of the strain gage and stored within the one or more memory devices to be used by the processing module in determining the amount of deformation of the strain gage.

In any case, in this example, to determine the amount of deformation of the strain gage while the force is exerted by the load upon the sensing node of the load cell, the processing module may determine a loaded resistance of the strain gage while the load is exerted upon the sensing node of the load cell, and determine the amount of deformation of the strain gage based on one or more of a difference between the loaded resistance and the nominal resistance, a difference between a voltage across the loaded resistance and a voltage across the nominal resistance, and a difference between a current passing through the loaded resistance and a current passing through the nominal resistance.

As one example, if the nominal resistance of the strain gage is assumed to equal $R_{nominal}$ ohms, and the loaded resistance of the strain gage is assumed to equal $R_{loaded}$ ohms, the processing module may determine the amount of deformation of the strain gage by determining a difference between $R_{loaded}$ and $R_{loaded}$ using the following relationship:

$$AMT_{deform} \propto abs[R_{loaded} - R_{nominal}] \quad \text{EQ. 1}$$

In EQ. 1, $AMT_{deform}$ indicates the amount of deformation of the strain gage, abs $[R_{loaded} - R_{nominal}]$ indicates an absolute value of the difference between $R_{loaded}$ and $R_{loaded}$, and $\propto$ indicates direct proportionality. Accordingly, in some examples, the amount of deformation of the strain gage may be directly proportional to the absolute value of the difference between the loaded resistance and the nominal resistance of the strain gage. Alternatively, in other examples, the amount of deformation of the strain gage may be determined based on the absolute value of the difference between the loaded resistance and the nominal resistance of the strain gage, and one or more non-linear relationships. In a similar manner, the amount of deformation of the strain gage may be determined based on an absolute value of a difference between a voltage across the loaded resistance and a voltage across the nominal resistance, and/or a difference between a current passing through the loaded resistance and a current passing through the nominal resistance, as previously described.

In still other examples, to determine the force in the one or more of the first, second, and third directions based on the amount of deformation of each strain gage, as described above, the processing module may determine the force in the first direction based on an amount of deformation of each strain gage of the first one or more strain gages, determine the force in the second direction based on an amount of deformation of each strain gage of the second one or more strain gages, and determine the force in the third direction based on an amount of deformation of each strain gage of the third one or more strain gages. Accordingly, the processing module may determine the component of the force in each of the first, second, and third directions based on the amount of deformation of each strain gage configured to deform in that direction in response to the corresponding component of the force, as described above.

Furthermore, in the examples described above, each of the first, second, and third directions may be perpendicular with respect to the other ones of the first, second, and third directions. For example, the first, second, and third directions may correspond to the X-, Y-, and Z-directions within the three-dimensional coordinate system, respectively, relative to the load cell, as previously described.

Finally, in some examples, the processing module may still further output one or more signals indicative of the determined force in the one or more of the first, second, and third directions (508). For example, the processing module may output a first signal indicative of the magnitude of the component of the force that corresponds to the first direction, output a second signal indicative of the magnitude of the component of the force that corresponds to the second direction, and output a third signal indicative of the magnitude of the component of the force that corresponds to the third direction.

As evidenced by the examples described above, the techniques of this disclosure may, in some cases, enable the sensing system including the processing module and the load cell, as described above, to sense the force exerted by the load upon the sensing node of the load cell in the one or more of the first, second, and third directions relative to the load cell. Accordingly, in contrast to other force sensing techniques, for example, techniques using a load cell configured for measuring force in one or two directions (e.g., the X- and/or Y-directions) relative to the load cell, as described above, the techniques of this disclosure may enable sensing the force in each of the first, second, and third directions, as well as any combination thereof.

In this manner, the method of FIG. 5 represents an example of a method of sensing a force exerted by a load upon a sensing node of a load cell in one or more of a first, second, and third directions relative to the load cell, the method comprising determining an amount of deformation of each strain gage of a first one or more strain gages disposed upon a first one or more of a plurality of sensing beams disposed between the sensing node and a base of the load cell while the force is exerted by the load upon the sensing node of the load cell, wherein the amount of deformation of the respective strain gage is indicative of a magnitude of a component of the force that corresponds to the first direction, determining an amount of deformation of each strain gage of a second one or more strain gages disposed upon a second one or more of the plurality of sensing beams while the force is exerted by the load upon the sensing node of the load cell, wherein the amount of deformation of the respective strain gage is indicative of a magnitude of a component of the force that corresponds to the second direction, and determining an amount of deformation of each strain gage of a third one or more strain gages disposed upon at least one of the first and second one or more of the plurality of sensing beams while the force is exerted by the load upon the sensing node of the load cell, wherein the amount of deformation of the respective strain gage is indicative of a magnitude of a component of the force that corresponds to the third direction.

The techniques of this disclosure may be implemented in a wide variety of computer devices. Any components, units, or modules that have been described are provided to emphasize functional aspects, and do not necessarily require realization by different hardware units. The techniques described herein may also be implemented in hardware, software, firmware, or any combination thereof. Any features described as modules, units, or components may be implemented together in an integrated logic device, or separately as discrete but interoperable logic devices. In some cases, various features may be implemented as an integrated circuit device, such as an integrated circuit chip, or chipset.

If any aspect of the techniques are implemented in software, the techniques may be realized at least in part by a computer-readable storage medium comprising instructions that, when executed in a processor, performs one or more of the methods described above. The computer-readable storage medium may comprise a tangible computer-readable storage medium, and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disc (CD), digital versatile disc (DVD), Blu-ray disc, holographic data storage media, or other non-volatile storage device.

The memory, or memory devices, described herein, which may be used as part of the described techniques, may also be realized in any of a wide variety of memory, or memory devices, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A load cell for sensing a force exerted by a load upon a sensing node of the load cell in one or more of a first, second, and third directions relative to the load cell, the load cell comprising:
   a plurality of sensing beams disposed between the sensing node and a base of the load cell;
   a first one or more strain gages disposed upon a first one or more of the plurality of sensing beams, wherein each of the first one or more strain gages is positioned perpendicularly with respect to the first direction, and wherein the first one or more of the plurality of sensing beams and the first one or more strain gages disposed thereon deform in response to a component of the force that corresponds to the first direction;
   a second one or more strain gages disposed upon a second one or more of the plurality of sensing beams, wherein each of the second one or more strain gages is positioned perpendicularly with respect to the second direction, and perpendicularly with respect to each of the first one or more strain gages, and wherein the second one or more of the plurality of sensing beams and the second one or more strain gages disposed thereon deform in response to a component of the force that corresponds to the second direction; and a third one or more strain gages disposed upon at least one of the first and second one or more of the plurality of sensing beams, wherein each of the third one or more strain gages is positioned perpendicularly with respect to the third direction, and perpendicularly with respect to each of the first and second one or more strain gages, and wherein the at least one of the first and second one or more of the plurality of sensing beams and the third one or more strain gages disposed thereon deform in response to a component of the force that corresponds to the third direction, wherein each of the plurality of sensing beams has three or more alternately orthogonally-oriented substrate sections with a strain gage disposed on each substrate section.

2. The load cell of claim 1, further comprising a processing module configured to:

for each strain gage of the first, second, and third one or more strain gages, determine an amount of deformation of the respective strain gage while the force is exerted by the load upon the sensing node of the load cell, and determine the force in the one or more of the first, second, and third directions based on the amount of deformation of each strain gage.

3. The load cell of claim 2, wherein the processing module is further configured to, for each strain gage of the first, second, and third one or more strain gages, determine a nominal resistance of the respective strain gage while no load is exerted upon the sensing node of the load cell, and wherein to determine the amount of deformation of the strain gage while the force is exerted by the load upon the sensing node of the load cell, the processing module is configured to:

determine a loaded resistance of the strain gage while the load is exerted upon the sensing node of the load cell; and determine the amount of deformation of the strain gage based on one or more of a difference between the loaded resistance and the nominal resistance, a difference between a voltage across the loaded resistance and a voltage across the nominal resistance, and a difference between a current passing through the loaded resistance and a current passing through the nominal resistance.

4. The load cell of claim 2, wherein to determine the force in the one or more of the first, second, and third directions based on the amount of deformation of each strain gage, the processing module is configured to:

determine the force in the first direction based on an amount of deformation of each strain gage of the first one or more strain gages;

determine the force in the second direction based on an amount of deformation of each strain gage of the second one or more strain gages; and determine the force in the third direction based on an amount of deformation of each strain gage of the third one or more strain gages.

5. The load cell of claim 1, wherein each of the first, second, and third one or more strain gages deform in response to the component of the force that corresponds to the respective one of the first, second, and third directions, and do not substantially deform in response to the components of the force that correspond to the remaining directions.

6. The load cell of claim 1, wherein one or more of the first, second, and third one or more strain gages each comprise at least two strain gages, and wherein two strain gages of each of the one or more of the first, second, and third one or more strain gages are disposed upon each sensing beam of the respective one or more of the first and second one or more of the plurality of sensing beams upon which the respective one of the one or more of the first, second, and third one or more strain gages is disposed.

7. The load cell of claim 1, wherein the third one or more strain gages comprise at least four strain gages, and wherein four strain gages of the third one or more strain gages are disposed upon each sensing beam of the at least one of the first and second one or more of the plurality of sensing beams upon which the third one or more strain gages are disposed.

8. The load cell of claim 1, wherein one or more of the first, second, and third one or more strain gages are configured in one of a Wheatstone-Bridge configuration, a Half-Bridge configuration, a Quarter-Bridge configuration, and a resistive divider configuration in conjunction with one or more resistive elements.

9. A sensing beam disposed between a base of a load cell and a sensing node of the load cell, the sensing beam configured for sensing a force exerted by a load upon the sensing node in one or more of a first and a second direction relative to the load cell, the sensing beam comprising:

a first section configured to deform in response to a component of the force that corresponds to the first direction;

a second section configured to deform in response to a component of the force that corresponds to the second direction; and, a third section configured to deform in response to the component of the force that corresponds to the first direction, wherein each of the first, second and third sections are alternately orthogonally-oriented with a strain gage disposed on each section.

10. The sensing beam of claim 9, wherein the first section is configured perpendicularly with respect to the first direction, and wherein the second section is configured perpendicularly with respect to the second direction and with respect to the first section.

11. The sensing beam of claim 9, wherein the first section is further configured to not substantially deform in response to the component of the force that corresponds to the second direction, and wherein the second section is further configured to not substantially deform in response to the component of the force that corresponds to the first direction.

12. The sensing beam of claim 9, wherein one of the first section and the second section comprises two sub-sections, and wherein the other one of the first section and the second section comprises a single section.

13. The sensing beam of claim 12, wherein each of the two sub-sections of the one of the first section and the second section is disposed adjacent to the single section of the other one of the first section and the second section, such that the single section is disposed between the two sub-sections.

14. The sensing beam of claim 9, further comprising a first one or more strain gages disposed upon the first section, wherein the first one or more strain gages are configured to deform in response to the component of the force that corresponds to the first direction, and a second one or more strain gages disposed upon the second section, wherein the second one or more strain gages are configured to deform in response to the component of the force that corresponds to the second direction.

15. A method of sensing a force exerted by a load upon a sensing node of a load cell in one or more of a first, second, and third directions relative to the load cell, the method comprising:
   determining an amount of deformation of each strain gage of a first one or more strain gages disposed upon a first one or more of a plurality of sensing beams disposed between the sensing node and a base of the load cell while the force is exerted by the load upon the sensing node of the load cell, wherein the amount of deformation of the respective strain gage is indicative of a magnitude of a component of the force that corresponds to the first direction;
   determining an amount of deformation of each strain gage of a second one or more strain gages disposed upon a second one or more of the plurality of sensing beams while the force is exerted by the load upon the sensing node of the load cell, wherein the amount of deformation of the respective strain gage is indicative of a magnitude of a component of the force that corresponds to the second direction; and
   determining an amount of deformation of each strain gage of a third one or more strain gages disposed upon at least one of the first and second one or more of the plurality of sensing beams while the force is exerted by the load upon the sensing node of the load cell, wherein the amount of deformation of the respective strain gage is indicative of a magnitude of a component of the force that corresponds to the third direction,
   wherein each of the plurality of sensing beams has three or more alternately orthogonally-oriented substrate sections with a strain gage disposed on each substrate section.

16. The method of claim 15, further comprising:
   determining the force in the one or more of the first, second, and third directions based on the amount of deformation of each strain gage of the first, second, and third one or more strain gages.

17. The method of claim 16, further comprising:
   for each strain gage of the first, second, and third one or more strain gages, determining a nominal resistance of the respective strain gage while no load is exerted upon the sensing node of the load cell, and wherein determining the amount of deformation of the strain gage while the force is exerted by the load upon the sensing node of the load cell comprises:
      determining a loaded resistance of the strain gage while the load is exerted upon the sensing node of the load cell; and
      determining the amount of deformation of the strain gage based on one or more of a difference between the loaded resistance and the nominal resistance, a difference between a voltage across the loaded resistance and a voltage across the nominal resistance, and a difference between a current passing through the loaded resistance and a current passing through the nominal resistance.

18. The method of claim 16, wherein determining the force in the one or more of the first, second, and third directions based on the amount of deformation of each strain gage comprises:
   determining the force in the first direction based on an amount of deformation of each strain gage of the first one or more strain gages;
   determining the force in the second direction based on an amount of deformation of each strain gage of the second one or more strain gages; and
   determining the force in the third direction based on an amount of deformation of each strain gage of the third one or more strain gages.

19. The method of claim 16, further comprising:
   outputting one or more signals indicative of the determined force in the one or more of the first, second, and third directions, wherein outputting the one or more signals indicative of the determined force in the one or more of the first, second, and third directions comprises:
      outputting a first signal indicative of the magnitude of the component of the force that corresponds to the first direction;
      outputting a second signal indicative of the magnitude of the component of the force that corresponds to the second direction; and
      outputting a third signal indicative of the magnitude of the component of the force that corresponds to the third direction.

20. The method of claim 15, wherein each of the first, second, and third directions is perpendicular with respect to the other ones of the first, second, and third directions.

* * * * *